Patented Aug. 2, 1927.

1,637,963

UNITED STATES PATENT OFFICE.

FERNAND SAUVAGÉ, OF PARIS, FRANCE.

PHOSPHORESCENT LUMINOUS ENAMEL.

No Drawing. Application filed September 21, 1925, Serial No. 57,795, and in France October 4, 1924.

The present invention has for its subject the coating of all objects, statuettes, vases, sculptures and so forth of earthenware, plaster, artificial marble, metal, porcelain, unglazed porcelain and of plastic materials, with a luminous, phosphorescent, translucent, washable and unchangeable enamel.

The result obtained by this luminous, phosphorescent enamel gives to all these articles:—

1. The appearance and advantages of porcelains and ceramic ware.
2. The coating of luminous materials by means of a hard and washable enamel which protects them against moisture and causes for de-composition: becoming dull, disaggregation, reduction of luminosity and so forth.
3. The property of being luminous in the dark.

The luminous enamel is not only superficial. It includes a number of operations which are as follows:—

1. The preparation of the articles or the surfaces so as to render them suitable for receiving the luminous phosphorescent enamel.
2. The application in successive layers of the luminous products, with successive dryings.
3. Decorating operations if necessary.
4. The application of the luminous transparent enamel itself.
5. Drying by suitable baking.

I. Preparation of articles or surfaces to be enamelled.

Articles made of a material which has not been baked, such as plaster, are subjected to a drying action at a suitable temperature.

In order to stop the porosity thereof they are coated with stearine or a layer of impermeable varnish, gum-lac and so forth.

In the case of articles of metals other than zinc, it is necessary to protect the metal by means of an insulating material with a base of gum-lac or other suitable varnish.

II. The luminous products used are phosphorescent zinc sulphides and can be radiferous for certain applications.

These sulphides of zinc are in daylight of a yellow white which has a close resemblance to ivory.

In the dark these phosphorescent zinc sulphides become of a yellow, green, red and so forth luminosity according to the phosphorogene which they contain.

The zinc sulphides may also be coloured by the addition to varnishes of a non-decomposable colouring agent and which is sufficiently transparent such as anilines. The luminous enamel will then have in daylight the colour of the colouring agent employed but in the dark it will retain the luminous colour of the zinc sulphide used.

The phosphorescent zinc sulphides are present in the form of very fine crystals but insoluble in water, petrol, alcohol and so forth. It is therefore essential to use them under conditions which enable them to be placed in thin layers on the object to be enameled. For this purpose these products are carefully screened and mixed as intimately as possible with varnishes of which the composition may vary and of which a few formulæ are given below which may be modified by equivalents.

*Alcohol varnish.*—Alcohol 1 litre, mastic 50 grammes, bleached gum-lac 100 grammes, Canadian balm 10 grammes.

*Cellulose acetate varnish.*—Cellulose acetate 50 grammes, triacetine 5 grammes, ethane tetrachloride 950 grammes, alcohol 95° 100 grammes.

*Celluloid varnish.*—Celluloid 4 grammes, acetone 50 grammes, amylacetate 50 grammes, Canadian balm 1.25 grammes.

*Petrol varnish.*—Dammar 46 grammes, petrol 54 grammes.

The first layer consisting of varnish mixed with zinc sulphides in the proportion of about 50% is applied. This first layer is dried in twenty-four hours in a furnace at 60 or 65° C.

The number of successive layers may vary from three to six layers when drying in a stove of which the temperature is increased by 10° after each layer.

For unglazed porcelain, ceramic ware, baked earthenware and so forth the temperature may be raised up to the limit of decomposition of the gums and varnish employed.

III. *Decoration of objects.*

This decoration of the eyes, eye-lids, hair, muscles, veils, ornaments, etc., may be effected in colours, either by transparent lacquers which allow some of the luminosity of the product to pass therethrough, or by nontransparent colours which do not allow the passage of luminosity in the dark.

IV. By means of the successive coatings the object treated has a smooth surface and from which only hardness and the final brilliancy, which is necessary to constitute a phosphorescent luminous enamel, are missing.

The enamelling is completed by two or three layers of a hard transparent varnish or enamel, used alone, of which the composition may be varied according to the formulæ given below or according to other equivalents.

The objects enamelled in this manner are passed through a furnace after each varnishing, the temperature limit to be reached being that of the products constituting the enamel or the varnishes.

*Formula of varnishes used without a luminous product.*

*Varnish I b K.*—Bleached gum-lac 100 grammes, sanderac 200 grammes. mastic 50 grammes, Venetian terebenthine 100 grammes, alcohol 1 litre.

*Varnish of nitrocellulose.*—Nitrocellulose 60 grammes, gum-lac 100 grammes, essence of terebenthine 500 grammes, methyl alcohol 500 grammes, amyl acetate 1 litre.

Dealing for example with a dull unglazed porcelain statuette of Venus de Milo.

Treated with luminous enamel with phosphorescent zinc sulphide of yellow colour, its appearance in daylight is that of a slightly yellow ivory statue.

If this statue is placed in the half light or in the dark all the parts which have been illuminated become of a lively yellow luminosity which causes the whole statue to become translucid as though it was illuminated internally. The parts which are less illuminating have a less lively luminosity.

It will thus be seen that these objects receive luminous effects varying according to the quantity and the direction of the luminous rays, thus producing the most artistic light and shade effects, luminous effects which may continue for a number of hours if the object itself has been exposed for a number of hours to light or if the products themselves are radiferous.

Moreover in the case of one or more personages luminous products of different colours may be used thus giving different luminosities in the dark. These statuettes reproductions of animals, flowers and so forth may thus be employed not only as artistic objects but as useful objects such as ladies' work baskets, boxes, ink stands, ornaments for pendula, candelabra, lamps and so forth.

Having thus described my invention, what I claim as new and desire to secure by Letters Patent is:—

A method of rendering objects luminous in the dark consisting in coating the objects with layers of a mixture of a varnish and phosphorescent zinc sulphide, and drying the article after each coating at a temperature of about 65° C. and increasing the temperature by 10° after the application of each layer.

FERNAND SAUVAGÉ.